US010768912B1

(12) United States Patent
Quinn et al.

(10) Patent No.: US 10,768,912 B1
(45) Date of Patent: Sep. 8, 2020

(54) PLATFORM CLASS CREATION

(71) Applicant: Workday, Inc., Pleasanton, CA (US)

(72) Inventors: Norrie Quinn, Livermore, CA (US); Kashif Qayyum, Fremont, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 16/277,595

(22) Filed: Feb. 15, 2019

(51) Int. Cl.
*G06F 8/41* (2018.01)
*G06F 8/34* (2018.01)
*G06F 8/60* (2018.01)

(52) U.S. Cl.
CPC ............... *G06F 8/41* (2013.01); *G06F 8/34* (2013.01); *G06F 8/60* (2013.01)

(58) Field of Classification Search
CPC .............. G06F 8/41; G06F 8/34; G06F 8/60
USPC ......................................................... 717/140
See application file for complete search history.

(56) References Cited

U.S. PATENT DOCUMENTS

| | | | | |
|---|---|---|---|---|
| 5,911,076 A * | 6/1999 | Acker | ..................... | G06F 8/447 717/104 |
| 6,735,598 B1 * | 5/2004 | Srivastava | ........... | G06F 9/44521 707/803 |
| 7,210,132 B2 * | 4/2007 | Rivard | ...................... | G06F 8/51 717/108 |
| 9,760,346 B2 * | 9/2017 | Villadsen | .................. | G06F 8/41 |
| 10,146,515 B1 * | 12/2018 | Sundresh | ................... | G06F 8/41 |
| 10,223,097 B2 * | 3/2019 | Weber | ....................... | G06F 8/65 |
| 2003/0225935 A1 * | 12/2003 | Rivard | ..................... | G06F 8/51 719/328 |
| 2004/0194060 A1 * | 9/2004 | Ousterhout | ........... | G06F 9/5072 717/120 |
| 2006/0156284 A1 * | 7/2006 | Srinivasan | ............... | G06F 8/20 717/119 |
| 2008/0189677 A1 * | 8/2008 | Cote | ......................... | G06F 8/34 717/105 |
| 2012/0240098 A1 * | 9/2012 | Souza | ...................... | G06F 8/20 717/104 |
| 2014/0359587 A1 * | 12/2014 | Villadsen | .................. | G06F 8/41 717/143 |
| 2017/0147324 A1 * | 5/2017 | Weber | ....................... | G06F 8/65 |
| 2018/0321918 A1 * | 11/2018 | McClory | ................... | G06F 8/71 |

OTHER PUBLICATIONS

Parrish et al, "Class Development and Testing in the Small", [Online], 2000, pp. 139-145, [Retrieved from internet on May 13, 2020], <https://dI.acm.org/doi/pdf/10.1145/1127716.1127750> (Year: 2000).*

(Continued)

*Primary Examiner* — Geoffrey R St Leger
*Assistant Examiner* — Zengpu Wei
(74) *Attorney, Agent, or Firm* — Van Pelt, Yi & James LLP

(57) ABSTRACT

A system for class deployment includes an ancillary class storage device and a processor. The ancillary class storage device is configured to store an ancillary class source for an ancillary class, where the ancillary class is outside a base class set. The processor is configured to compile the ancillary class source, where compiling the ancillary class source generates a metadata description of one or more ancillary classes; and deploy the metadata description into an operating environment, where deploying the metadata description adds the metadata description to metadata of the base class set of the operating environment.

18 Claims, 11 Drawing Sheets

(56) References Cited

OTHER PUBLICATIONS

Lin et al, "A Method-based Tool Support for Rapid Software Development and Effective Process Management", 2013, pp. 115-118, [Retrieved from internet on May 13, 2020], <https://ieeexplore.ieee.org/stamp/stamp.jsp?tp=&arnumber=6754272> (Year: 2013).*

Leich et al, "Tool Support for FeatureOriented Software Development", 2005, pp. 55-59, [Retrieved from internet on May 13, 2020], <https://dl.acm.org/doi/pdf/10.1145/1117696.1117708> (Year: 2005).*

* cited by examiner

PLATFORM CLASS CREATION

BACKGROUND OF THE INVENTION

A software as a service database system is built using a metadata object graph. Developers of the database system create a set of functionality for their customers including business process operating on the object graph, reporting based on the object graph, integrated applications, etc. As the customer base of the database system grows, new functionality and applications are desired by the customers outside of the scope of the core business. Enabling outside (e.g., third party) developers to contribute functionality on the database system is desirable. However, this creates a problem where third party developer code must be guaranteed to interact with the database system safely—for example, without danger of damaging the metadata object graph and tolerant to updates of the database system.

BRIEF DESCRIPTION OF THE DRAWINGS

Various embodiments of the invention are disclosed in the following detailed description and the accompanying drawings.

DETAILED DESCRIPTION

Figure 1:
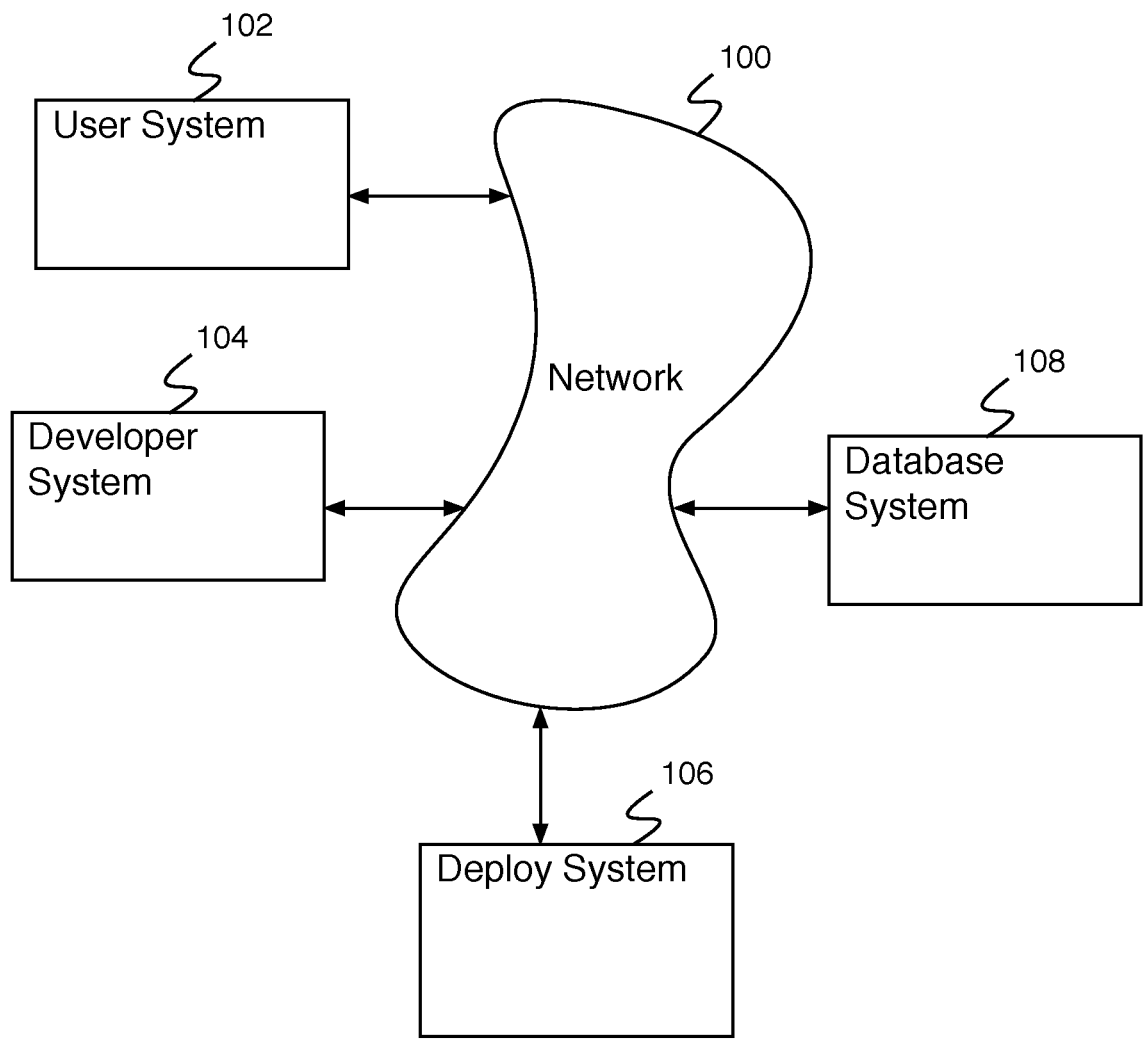
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for class deployment is disclosed. The system for class deployment comprises an ancillary class storage device configured to store an ancillary class source for an ancillary class, wherein the ancillary class is outside a base class set. The system for class deployment additionally comprises a processor configured to compile the ancillary class source, wherein compiling the ancillary class source generates a metadata description of one or more ancillary classes, and configured to deploy the metadata description into an operating environment, wherein deploying the metadata description adds the metadata description to metadata of the base class set of the operating environment. In some embodiments, the system for class deployment additionally comprises a memory coupled to the processor and configured to provide the processor with instructions.

A system for class deployment comprises a runtime system for implementing a database system. The database system comprises a metadata object graph for describing database information. Objects in the metadata object graph comprise class instances, each instance comprising attributes (e.g., data describing the class instance) and relationships (e.g., connections to other instances in the object graph). For example, an instance of a business worker object might have attributes for name, social security number, salary, address, etc., and relationships to a manager object instance, a set of subordinate object instances, a business location object instance, etc. The database system includes a base class set, comprising a set of classes developed by the database system developer for basic use of the system, including, for example, a worker class, a business location class, a project class, a performance review class, a transaction class, an account class, etc. Database system developers author classes (e.g., new high level data representations), reports (e.g., processes for aggregating and presenting class attribute data), and applications (e.g., automated processes for adding data, deleting data, modifying data, interacting with a user, etc.) that add to and interact with the base class set. A tool is developed to enable developers to develop analogous functionality. In some embodiments, the tool comprises an integrated development environment (IDE) for designing applications within the database system. In some embodiments, the tool comprises a service based compilation solution with an application programming interface (API) that is used by a developer to design applications within the database system. New classes for the database system are developed as part of application development. The source code authored by the third party developer is stored in an ancillary class storage device (e.g., a storage device for storing third party application code). In order to use the code, the source code is compiled. As part of compiling the source code, a class description, included as part of the code, is compiled into a compiled binary format (archive), and it is this archive that is deployed. When the archive is deployed, it is transformed into an appropriate metadata description (e.g., a description corresponding to the class configuration) for inclusion in the metadata object graph. The metadata description is then deployed into the operating environment, wherein deploying the metadata description adds the metadata description to metadata of the base class set of the operating environment. For example, relations from object instances in the metadata description to object instances of the base class set are formed.

An ancillary class is identified with a unique source artifact identifier. A metadata artifact is identified in the runtime system with a unique metadata artifact identifier. Rather than rebuilding the metadata database to utilize unique source artifact identifiers, ancillary classes are transformed to metadata classes at runtime, including unique metadata artifact identifiers. The ancillary metadata classes are deployed into the operating environment and handled by the object management system of the runtime system like a base class. The ancillary metadata classes are typically not persisted into a metadata store. Once the new metadata classes are deployed into the operating environment, licensed tenants (e.g., tenants that have acquired a license to use the application) have access to use the class. Other tenants would not know of the class or be able to use it; the ancillary class metadata is filtered/hidden from unlicensed tenants. Attributes and relationships for ancillary classes are identified with their own unique source artifact identifiers. When the ancillary classes are transformed to metadata classes, the attributed and relations are also transformed to have unique metadata artifact identifiers.

An ancillary model is edited in its source form by a developer to build an application. Programming artifacts are modeled including classes, attributes, relationships, code, and tests. These artifacts are identified by a unique source artifact identifier. In some embodiments, the output from the IDE is compiled and serialized code artifacts. A module of code artifacts is serialized into an archive file. As the developer uses the developer IDE, they deploy the archive file to a running isolated development environment. This is called dynamic deployment. The archive can also be statically deployed to any system during startup.

In some embodiments, the output from an API tool is compiled into serialized code artifacts. A module of code artifacts is serialized into an archive file. As the developer uses the developer API, they deploy the archive file to a running isolated development environment. This is also termed dynamic deployment. Similarly, the archive can also be statically deployed to any system during startup A class is required to have a unique metadata artifact identifier in the runtime system. An ancillary class is associated with a unique source artifact identifier. A unique metadata artifact identifier is allocated for each ancillary class. This allocation is persisted in a storage to ensure it is durable for use with tenanted data.

As the system supports multi-tenancy and frequently moves tenants from one service to another, it also needs to be made sure that there are no conflicts between class identifiers of multiple applications for multiple tenants. In some embodiments, this is achieved by globally allocating an identifier for every class.

The object management server (OMS) is a metadata driven service that executes read and update transactions on a tenanted object graph. The metadata that drives the application is not persisted in the tenant, but is shared across all tenants on a running OMS. Metadata is edited an internal development environment and eventually serialized into a binary to be tested and deployed to production.

A metadata object has attributes and references to other objects in the metadata graph. Tenanted instances also reference metadata objects. A class defines what attributes and relationships an object instance may have. Each instance has an instance identifier, a "uniqueID" (UID), and a unique metadata artifact identifier. The unique metadata artifact identifier is essentially a unique source artifact identifier and is mainly used for external identity. The UID is an encoded long integer or long word, including bits for the class and bits for the instance.

Numerous frameworks are configured by this metadata, including classes, attributes, relations to other classes, relations to other resources, query indexing, business objects, business object fields, data sources, application programming interfaces (APIs), and security domains. These frameworks have been under development for many years and it is preferable to use them unchanged.

In some embodiments, identifier allocations occur when an application is published.

Meaningful names for runtime classes, attributes, and relationships increases supportability. The names defined in the developer system (e.g., API or IDE) will be used at runtime. To avoid name conflicts between applications in the same runtime, a metadata system namespace will be used for the metadata created for each application.

An attribute is created in metadata for each ancillary class attribute. Attributes in the ancillary class creation language are unique to the class. Ancillary class attributes are transformed to unique attributes in the runtime metadata. To avoid creating a namespace per class, the attribute names are prefixed with the class name. This is similar to a common pattern in applications.

In some embodiments, a one way relationship is created in metadata for each ancillary class relationship. In the development system, the third party developer can create a reference to some abstract object or service resource that represents a base class. However, at runtime the resource abstraction is elided and this turns into a regular one-way relationship.

As applications evolve, the third party developer will publish new versions. In a new version the third party developer may add new classes, add attributes to existing classes, add relationships to existing classes, rename classes, rename attributes, rename relationships, add functions, remove functions, or change functions. In a new version, the developer may not remove a class, remove an attribute, change an attribute type, remove a relationship, or change a relationship. These constraints are enforced by the system.

To deploy an ancillary code model in the OMS, the ancillary code artifacts are transformed to metadata. In some embodiments, the ancillary code model comprises an ancillary class model. This allows existing frameworks to be configured without modification for ancillary code compatibility. The classes, attributes and relationships modeled in the developer system or application are transformed to metadata for classes, attributes and relationships. The same model is also transformed to other higher level artifacts in metadata (e.g. an API).

Iterative Deployment—The developer creates a model in the developer system or application and deploys it again and again to the running isolated environment. Each change may add, modify or remove many artifacts in the database.

Circular Dependencies—The database is a complex graph which includes circular references within a model, and between models. Identifier (ID) Mapping—The identifier strategy of artifacts in the ancillary class model and metadata instances is different. The ancillary class model uses unique source artifact identifiers and fully qualified names for human readability in logging, for example. Metadata instances require a long (e.g., 64-bit number) at runtime that must be unique within that database environment. These need to be mapped consistently, and the mapped identifiers need to be durable. ID Publishing—Once published into the wider database pipeline, the mapped identifiers must be unique and consistent across the database. These identifiers can also never change, as tenanted data encoding will reference some of them. Artifact Isolation—As ancillary applications are implemented by external developers, generated artifacts cannot conflict—for example, in name. Multitenancy Visibility—Some metadata is exposed to users of the database application (e.g., business object definitions). Only metadata from licensed applications can be visible for a tenant on a multi-tenanted system. Unlike metadata created by internal tooling, this metadata is created at runtime and is not persisted or stored in a metadata binary.

This design mapping ancillary classes to runtime metadata instances can be generalized to other models. Implemented generically, the transformation of third party code artifacts to metadata would allow existing OMS runtime code to work with minimal changes, with no idea the metadata used was defined in the developer system or application. Ancillary classes provide simple modeling of objects, fields for reporting and a default application programming interface (API). To enable all developers to utilize ancillary classes, modeling or default metadata will be created for query and search indexes, business objects, reporting data sources, business object fields, and API's.

End user tasks for a tenant need to be prevented from seeing metadata that is not licensed when they are deployed on the same multi-tenant runtime OMS. Each task that lists a collection of this metadata will filter metadata from unlicensed application modules. Query and search indexing is modeled in the developer system or application using an aspect of a class.

Note the metadata created by one tenant is strictly private to any given tenant and is not be visible to any other unless express permission is given for sharing. For metadata developed by 3$^{rd}$ party vendors, the metadata is sometimes used commonly.

In some embodiments, it is possible to default a query index to a relationship to a class. A business object can be defaulted for each ancillary class, and each attribute and relationship can be transformed to a reporting field. In some embodiments, a class is created for each business object.

Identifier allocation happens as part of the pipeline before an application is deployed. The publish step of the pipeline includes generating an identifier mapping artifact that contains the identifier mapping for all the unique source artifact identifiers in a module.

A platform developer will also be able to iteratively develop with the developer system or application and deploy their application to an isolated operating environment, without a pipeline or storage of artifacts.

Unlike internal developers, third party developers will not modify base metadata, and so there is no issue with runtime metadata transformation being incompatible with the base system user interface or the base code repository process. The third party ancillary code project is version controlled using a separate repository from the base code repository.

A summary of the algorithm used to transform ancillary code artifacts to metadata artifacts is as follows:
1. navigate through the ancillary code model artifact graph in its compiled archive form, node by node;
2. execute a transform to create a metadata artifact builder for each artifact. The transform creates a named instance builder for each node in the ancillary code model, including nested instance builders. The transform creates an attribute builder for each modelled attribute on the instance in the ancillary code model. The transform creates a reference builder for each modelled reference on the instance in the ancillary code model. In the event the target of the reference is referenced by instance ID (e.g., it already exists in the metadata graph), then the existing target instance is retrieved. In the event the target of the reference is referenced by a relative name, builder is connected to the named target instance builder; and
3. build the graph using the builders. For each instance builder, the instance is created. In the event an ID mapping exists (e.g., the instance already exists in the metadata graph), the existing instance is retrieved and the instance is not created. In the event an ID mapping does not exist, the instance is created, the unique metadata artifact identifier is assigned from the unique source artifact identifier, and an instance ID is allocated. Note that instance IDs are only allocated here on isolated development systems—for production, they are allocated when the code model is initially published. For each attribute builder on each instance, the attributes are created. For each relationship builder on each instance, the relations are created. For each reference not connected, the reference is deleted. In the event the transformation is successful, the metadata is stored in memory. In the event the transformation is unsuccessful, any created metadata is deleted.

The system improves a computer system by enabling the system to adapt easily to changes in classes that are loaded in the system, especially in the case where all of the system and its applications are uniformly loaded at boot time. This allows for additional classes to be loaded to the system for applications and still be a part of a singular uniform system but not requiring the additional classes to come into the system through a separate additional pathway (e.g., for third party developers without disturbing the main system development).

FIG. 1 is a block diagram illustrating an embodiment of a network system. In some embodiments, the network system of FIG. 1 comprises a network system for a system for class deployment. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, developer system 104, deploy system 106, and database system 108 communicate via network 100. User system 102 comprises a user system for use by a user. User system 102 stores and/or accesses data on database system 108. A user uses a user system 102 to interact with database system 108, for example to store database data, to request database data, to create a report based on database data, to create a document, to access a document, to execute a database application, etc. Developer system 104 comprises a developer system for use by a developer. A developer utilizes developer system 104 to develop code—for example, database applications for execution by database system 108. In some embodiments, a developer utilizing developer system 104 to develop database applications for execution by database system 108 comprises a third-party developer (e.g., a developer not associated with either the database system provider or the user system organization). A third-party developer relies on a system provided by the database system provider for integrating third-party developed applications with database system 108. Deploy system 106 comprises a system for compiling, preparing, and/or deploying third-party developer applications and/or internally developed applications. For example, a developer using developer system 104 accesses an integrated development environment (e.g., an IDE or an API) running on deploy system 106 to create an application by writing code. The code creates new objects, with associated data and relations, and utilizes the objects for a particular application purpose. Deploy system 106 compiles the code and deploys it to a runtime environment on database system 108. For example, deploy system 106 dynamically deploys the code to an isolated runtime environment on database system 108 or statically deploys the code to a production environment on database system 108.

In some embodiments, class deploy system 106 comprises a system for class deployment comprising an ancillary class storage device and a processor. The ancillary class storage device is configured to store an ancillary class source for an ancillary class, wherein the ancillary class is outside a base class set. The processor is configured to compile the ancillary class source, wherein compiling the ancillary class source generates a metadata description of one or more ancillary classes, and deploy the metadata description into an operating environment, wherein deploying the metadata description adds the metadata description to metadata of the base class set of the operating environment.

Figure 2:
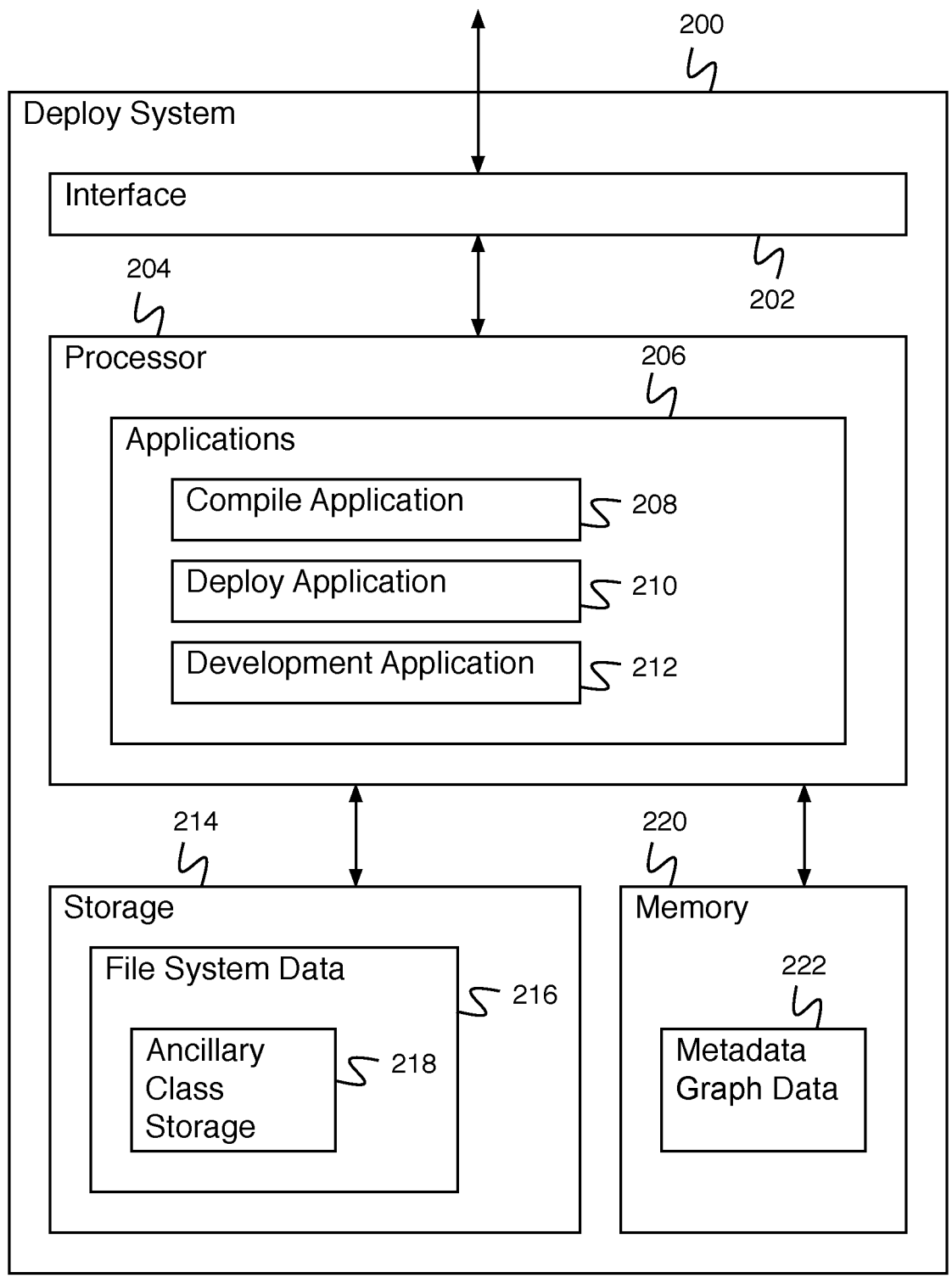
FIG. 2 is a block diagram illustrating an embodiment of a deploy system.

FIG. 2 is a block diagram illustrating an embodiment of a deploy system. In some embodiments, deploy system 200 is used to implement deploy system 106 of FIG. 1. In the example shown, deploy system 200 comprises interface 202. Interface 202 comprises an interface for communicating with external systems using a network. For example, interface 202 comprises an interface for communication with a developer system (e.g., for receiving an indication of code comprising an application, for receiving an indication to compile code, for receiving an indication to deploy code, etc.). Processor 204 comprises a processor for executing applications. Processor 204 comprises applications 206. Applications 206 comprises compile application 208, deploy application 210, and development application 212. For example, applications 206 comprises any other appropriate applications (e.g., a communications application, a chat application, a web browser application, a document preparation application, a data storage and retrieval application, a user interface application, a data analysis application, etc.). Development application 212 comprises an application for developing code (e.g., an integrated development environment—for example, an IDE or an API). For example, a developer utilizes development application 212 to develop ancillary class source for ancillary classes. Ancillary class source comprises a plurality of ancillary class source artifacts (e.g., classes, attributes, relations, code, tests, applications, business objects, fields, Representational State Transfer (REST) resources, REST representations, API representations, etc.). Each artifact comprise a unique source artifact identifier. Ancillary classes are stored by ancillary class storage 218. Compile application 208 comprises a compile application for compiling ancillary class source, transforming artifacts, etc. For example, compiling ancillary class source generates a metadata description of one or more ancillary classes. The metadata description comprises a plurality of metadata artifacts (e.g., classes, attributes, relations to other classes, relations to resources, query index information, business objects, business object fields, data sources, application programming interfaces, security domains, etc.), wherein each artifact comprises a unique metadata artifact identifier.

Deploy application 210 comprises an application for deploying code (e.g. deploying an application in a runtime environment). Storage 214 comprises a data storage for storing data. Storage 214 includes file system data 216 storing ancillary class storage 218. Ancillary class storage 218 comprises ancillary class data created by external developers (e.g., utilizing development application 212). Memory 220 comprises working application memory. Memory 220 stores metadata graph data 222—for example, data comprising metadata artifacts resulting from a transformation of ancillary class data stored by ancillary class storage 218. Metadata graph data is deployed on a database system by deploy application 210.

Deploy system 200 comprises a system for class deployment. Deploy system 200 comprises ancillary class storage 218 configured to store an ancillary class source for an ancillary class, wherein the ancillary class is outside a base class set. Deploy system 200 additionally comprises processor 204 configured to compile the ancillary class source using compile application 208, wherein compiling the ancillary class source generates a metadata description of one or more ancillary classes (e.g., stored by metadata graph data 222) and deploy the metadata description into an operating environment using deploy application 210, wherein deploying the metadata description adds the metadata description to metadata of the base class set of the operating environment.

Figure 3:
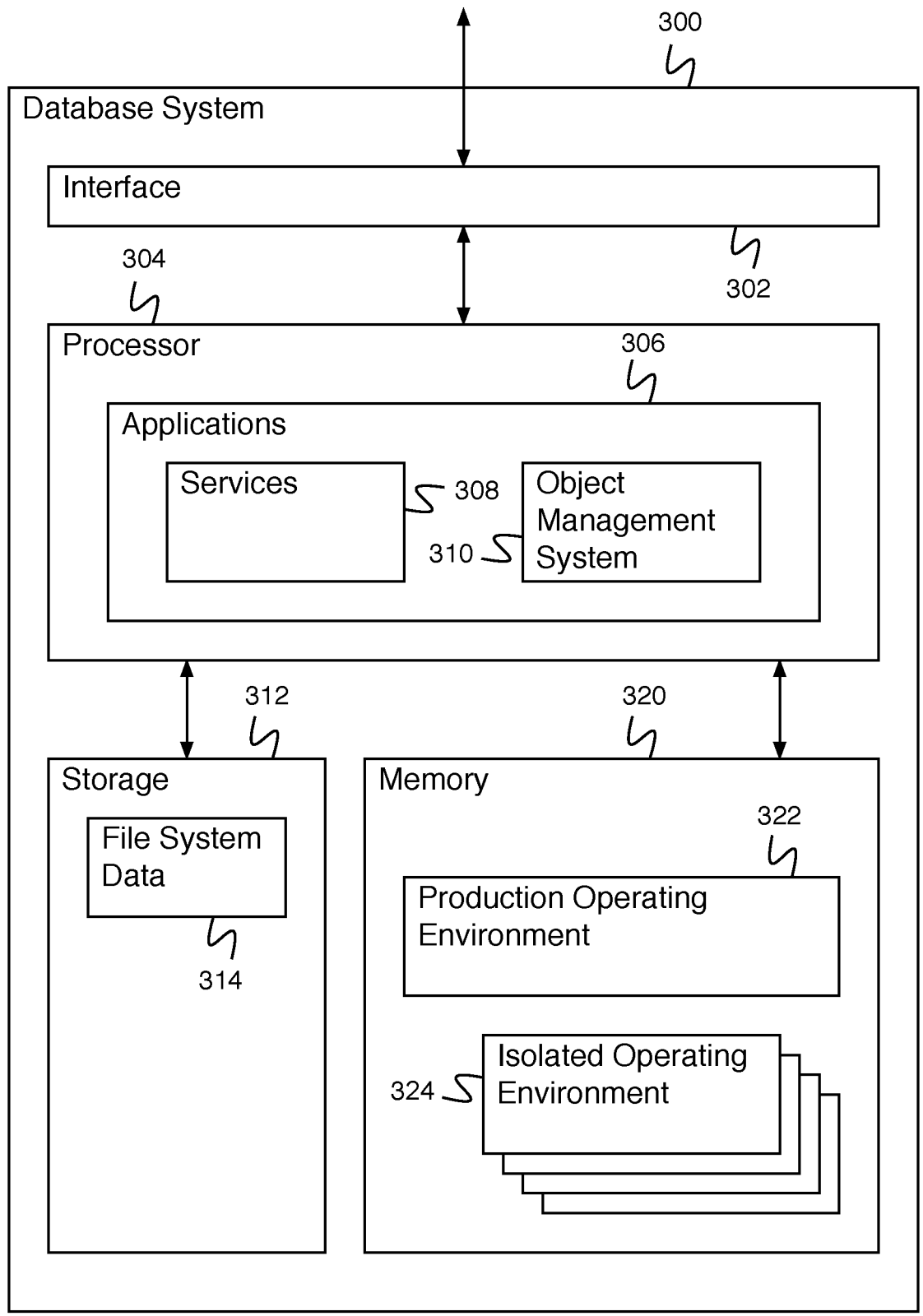
FIG. 3 is a block diagram illustrating an embodiment of a database system.

FIG. 3 is a block diagram illustrating an embodiment of a database system. In some embodiments, database system 300 comprises database system 108 of FIG. 1. In the example shown, database system 300 comprises interface 302. Interface 302 comprises an interface for communicating with other systems via a network. For example, a user using a user system communicates with database system 300 using interface 302 to store data, modify data, retrieve data, run applications, etc. A deploy system communicates with database system 300 using interface 302 to deploy metadata to an operating environment of memory 320. Processor 304 comprises a processor for executing applications. Processor 304 comprises applications 306. Applications 306 comprises services 308 (e.g., a communications application, a chat application, a web browser application, a document preparation application, a data storage and retrieval application, a user interface application, a data analysis application, system services, user services, etc.) and object management system 310. Object management system 310 comprises a system for accessing and interacting with database data of an operating environment of memory 320. Object management system 310 access objects, modifies objects, deletes objects, retrieves object data, creates new relations, creates new objects, etc. Database system 300 comprises storage 312 including file system data 314. Database system 300 comprises memory 320 including production operating environment 322 and a plurality of isolated operating environments 314. Production operating environment 322 comprises a runtime environment accessed by object management system 310 including data objects in use by users. Production operating environment 322 comprises objects of a base class set in addition to objects of ancillary classes that have been added by a deploy system. Plurality of isolated operating environments 324 comprises a set of isolated operating environments for use in testing. For example, an application built utilizing ancillary classes is deployed to an isolated operating environment and tested. An isolated operating environment comprises an isolated (e.g., not interacting with production operating environment 322 or other isolated operating environments) base operating environment including a set of base classes for testing integration of ancillary classes.

Figure 4:
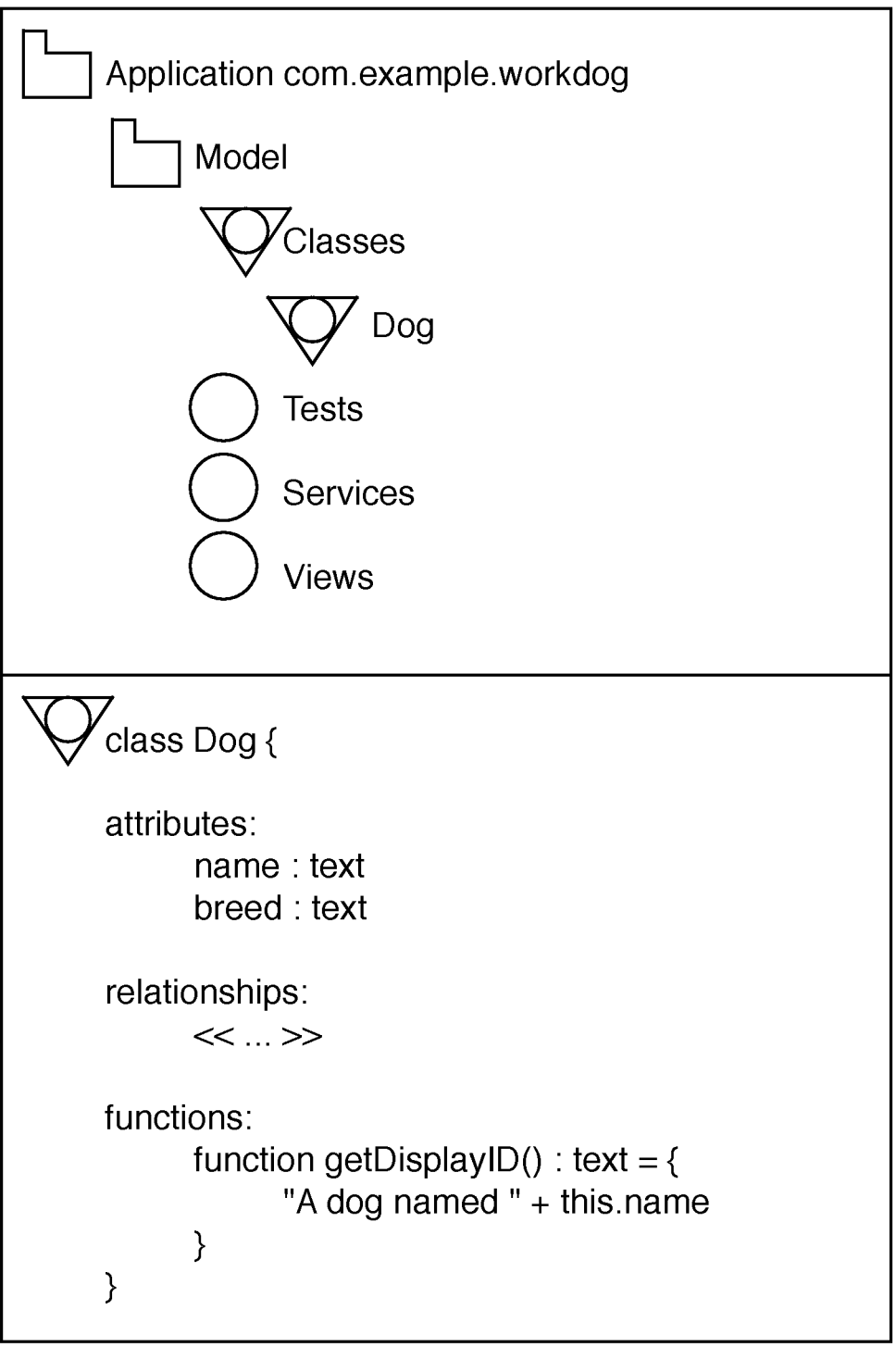
FIG. 4 is a diagram illustrating an embodiment of a user interface for an integrated development environment for application development.

FIG. 4 is a diagram illustrating an embodiment of a user interface for an integrated development environment for application development. In some embodiments, user interface 400 of FIG. 4 is provided by development application 212 of FIG. 2 for use in developing an ancillary class source or an updated version of an ancillary class source. Upper panel 402 of user interface 400 comprises a code explorer panel. In the example shown, the application under development is titled com.example.workdog. The workdog application comprises a model including a dog class. Lower panel 404 of user interface 400 comprises a code editor panel. In the example shown, lower panel 404 displays code for a Dog class. The Dog class comprises text attributes describing the dog name and the dog breed, one or more relationships, and a getDisplayID( ) function for displaying the dog name.

Figure 5:
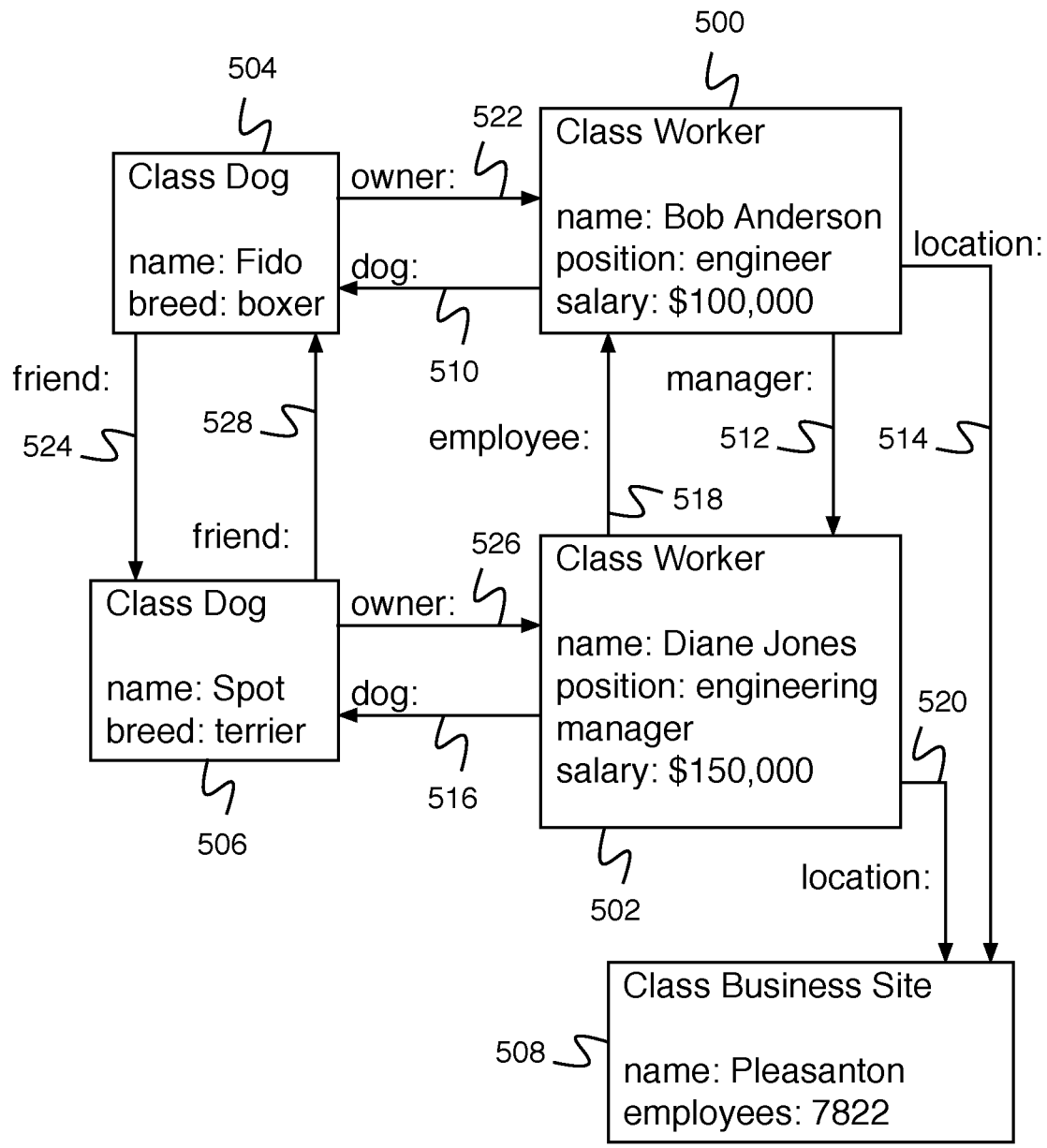
FIG. 5 is a diagram illustrating an embodiment of a metadata graph.

FIG. 5 is a diagram illustrating an embodiment of a metadata graph. In some embodiments, the metadata graph of FIG. 5 comprises a metadata graph for a database (e.g., a metadata graph stored in production operating environment 322 of database system 300). In the example shown, the metadata graph of FIG. 5 comprises instance of worker class 500 and instance of worker class 502. Instance of worker class 500 represents a worker with name Bob Anderson, position of engineer, and salary of $100,000. Instance of worker class 502 represents a worker with name Diane Jones, position of engineering manager, and salary of $150,000. The metadata graph of FIG. 5 additionally comprises instance of dog class 504 and instance of dog class 506. Instance of dog class 504 comprises a boxer named Fido and instance of dog class 506 comprises a terrier named Spot. The metadata graph of FIG. 5 additionally comprises instance of business site class 508, representing a business site named Pleasanton and comprising 7822 employees. Instance of worker class 500 comprises dog relation 510 to instance of dog class 504, manager relation 512 to instance of worker class 502, and location relation 514 to instance of business site class 508. Instance of worker class 502 comprises dog relation 516 to instance of dog class 506, employee relation 518 to instance of worker class 500, and location relation 520 to instance of business site class 508. Instance of dog class 504 comprises owner relation 522 to instance of worker class 500 and friend relation 524 to instance of dog class 506. Instance of dog class 506 comprises owner relation 526 to instance of worker class 502 and friend relation 528 to instance of dog class 504. The metadata graph of FIG. 5 represents an employee Bob Anderson and his manager Diane Jones, each of which works at the Pleasanton business site, and their dogs, Fido and Spot. In some embodiments, instance of worker class 500, instance of worker class 502, and instance of business site class 508 comprise instances of classes of a base class set. In some embodiments, instance of dog class 504 and instance of dog class 506 comprise instances of an ancillary class.

Figure 6:
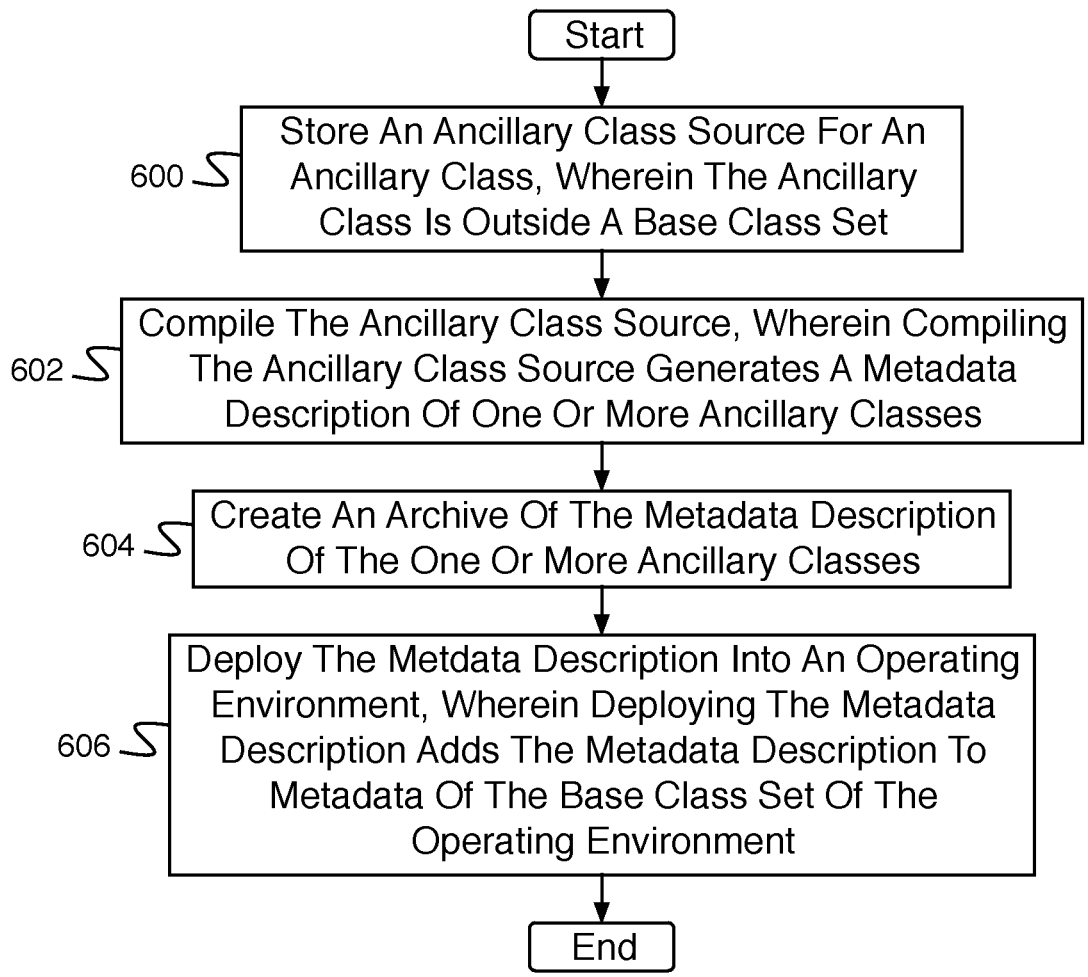
FIG. 6 is a flow diagram illustrating an embodiment of a process for class deployment.

FIG. 6 is a flow diagram illustrating an embodiment of a process for class deployment. In some embodiments, the process of FIG. 6 is executed by deploy system 106 of FIG. 1. In the example shown, in 600, an ancillary class source for an ancillary class is stored, wherein the ancillary class is outside a base class set. For example, the ancillary class source comprises a plurality of ancillary class source artifacts, wherein each artifact comprises a unique source artifact identifier. In 602, the ancillary class source is compiled, wherein compiling the ancillary class source generates a metadata description of one or more ancillary classes. In 604, an archive of the metadata description of the one or more ancillary classes is created. In 606, the metadata description is deployed into an operating environment, wherein deploying the metadata description adds the metadata description to metadata of the base class set of the operating environment.

Figure 7:
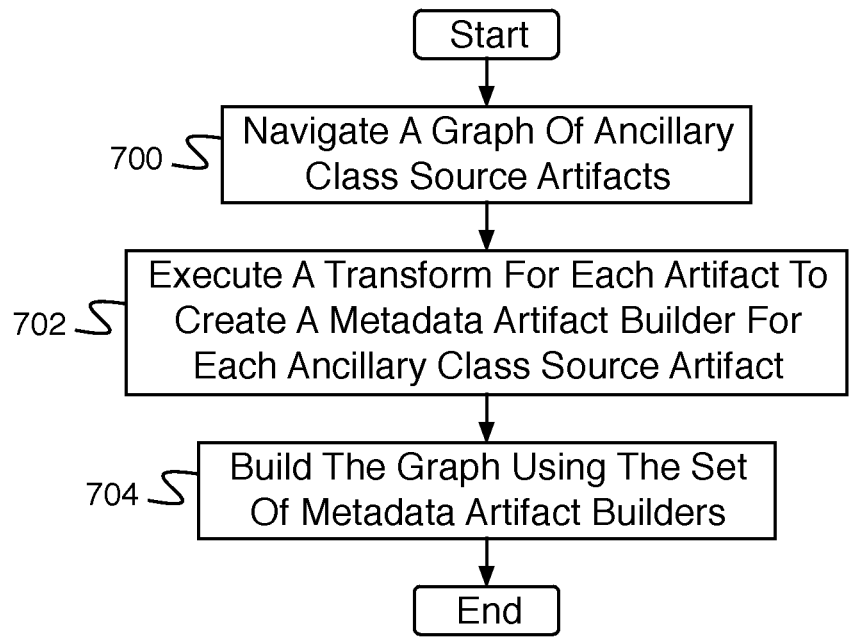
FIG. 7 is a flow diagram illustrating an embodiment of a process for compiling an ancillary class source.

FIG. 7 is a flow diagram illustrating an embodiment of a process for compiling an ancillary class source. In some embodiments, the process of FIG. 7 implements 602 of FIG. 6. In the example shown, in 700, a graph of ancillary class source artifacts is navigated. For example, the graph is navigated using a depth-first method, a breadth-first method, a greedy method, or any other appropriate graph navigation method. In 702, a transform is executed for each artifact to create a metadata artifact builder for each ancillary class source artifact. For example, an instance builder is created for each instance, an attribute builder is created for each attribute, and a relation builder is created for each relation. In 704, the graph is built using the set of metadata artifact builders. For example, each metadata artifact builder is executed to build the designated metadata artifact. The created metadata artifacts are stored, for example, in a metadata graph data storage (e.g., metadata graph data storage 222 of FIG. 2).

An instance builder builds a new instance when executed. When the new instance is built the instance builder determines a metadata artifact identifier for associating with the instance. For example, the metadata artifact identifier is based at least in part on an identifier associated with the instance transformed to create the instance builder. In the event the metadata artifact identifier for associating with the new instance is not already associated with another metadata instance, the instance builder builds the new instance and associates the new instance with the metadata artifact identifier. In the event the metadata artifact identifier for associating with the new instance is already associated with another metadata instance, the instance builder does not build a new instance.

A reference builder builds a new reference when executed. When the new instance is built the instance builder determines the entity targeted by the reference (e.g., referred to by the reference). In the event the entity targeted by the reference comprises an instance with a metadata artifact identifier, the reference is to the instance created. In the event the entity targeted by the reference comprises an instance that is not yet built, the reference is created to the referenced instance builder. In the event the graph building process completes and the referenced instance builder does not build the instance, the reference to the instance builder is deleted.

Figure 8:
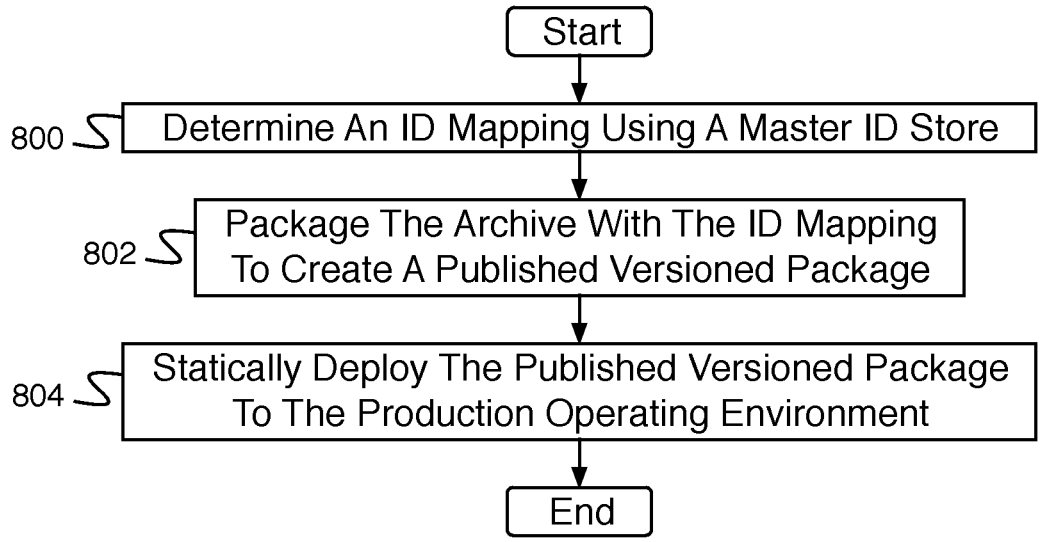
FIG. 8 is a flow diagram illustrating an embodiment of a process for deployment.

FIG. 8 is a flow diagram illustrating an embodiment of a process for deployment. In some embodiments, the process of FIG. 8 implements 606 of FIG. 6 using a static deployment (e.g., a long-term deployment to a production environment). In 800, an ID mapping is determined using a master ID store. The ID mapping generates IDs for the metadata artifacts for deployment. For example, the ID mapping generates permanent IDs without creating ID conflicts. In 802, the archive is packaged with the ID mapping to create a published versioned package. In 804, the published versioned package is statically deployed to the production operating environment.

Figure 9:
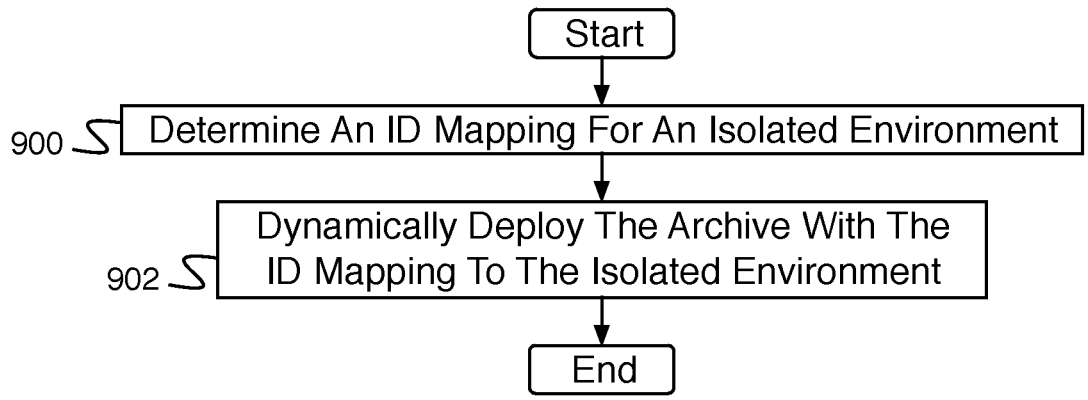
FIG. 9 is a flow diagram illustrating an embodiment of a process for deployment.

FIG. 9 is a flow diagram illustrating an embodiment of a process for deployment. In some embodiments, the process of FIG. 9 implements 606 of FIG. 6 using a dynamic deployment (e.g., a temporary deployment to an isolated environment). In 900, an ID mapping for an isolated environment is determined. For example, an ID mapping for an isolated environment comprises a temporary mapping determined to be compatible with a base class set. In 902, the archive is dynamically deployed with the ID mapping to the isolated environment.

Figure 10:
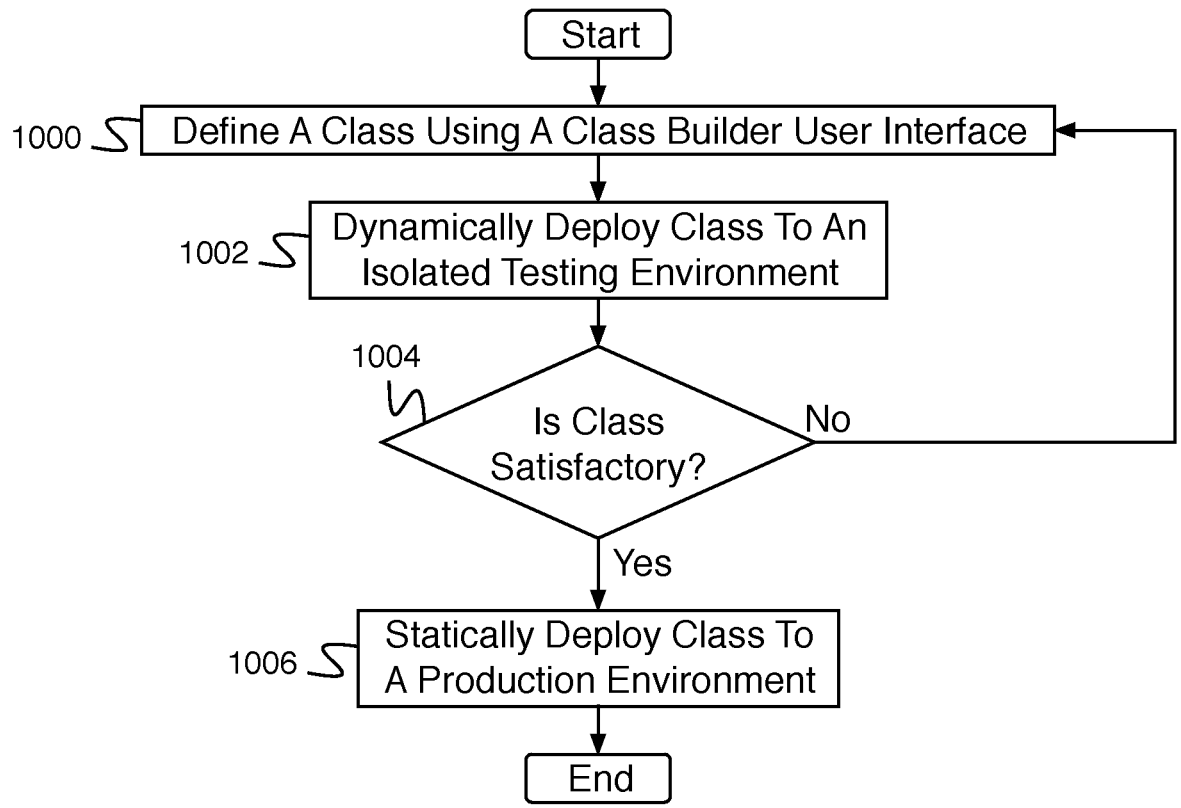
FIG. 10 is a flow diagram illustrating an embodiment of a process for class development.

FIG. 10 is a flow diagram illustrating an embodiment of a process for class development. In some embodiments, the process of FIG. 10 is executed by a developer using a developer system (e.g., developer system 104 of FIG. 1) interacting with a deploy system (e.g., deploy system 106 of FIG. 1). In the example shown, in 1000, a class is defined using a class builder user interface. In 1002, the class is dynamically deployed to an isolated testing environment. In 1004, it is determined whether the class is satisfactory. In various embodiments, it is determined whether the class is satisfactory by running tests, checking for errors, checking for correct output, etc. In the event it is determined that the class is not satisfactory, control passes to 1000. In the event it is determined that the class is satisfactory, control passes to 1006. In 1006, the class is statically deployed to a production environment.

Figure 11:
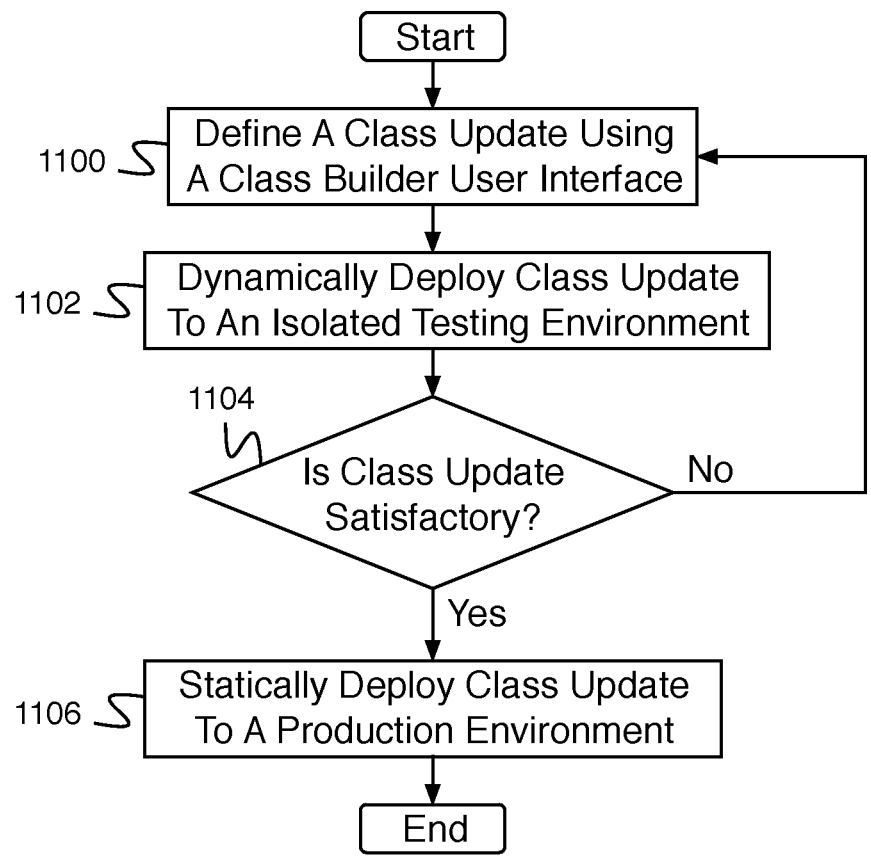
FIG. 11 is a flow diagram illustrating an embodiment of a process for class update development.

FIG. 11 is a flow diagram illustrating an embodiment of a process for class update development. In some embodiments, the process of FIG. 11 is executed by a developer using a developer system (e.g., developer system 104 of FIG. 1) interacting with a deploy system (e.g., deploy system 106 of FIG. 1). In the example shown, in 1100, a class update is defined using a class builder user interface. For example, an updated version of an ancillary class source is developed using an ancillary class development user interface. An updated version of an ancillary class source adds, modifies, or removes metadata artifacts from the ancillary class source. In 1102, the class update is dynamically deployed to an isolated testing environment. In 1104, it is determined whether the class update is satisfactory. In various embodiments, it is determined whether the class update is satisfactory by running tests, checking for errors, checking for correct output, etc. In the event it is determined that the class update is not satisfactory, control passes to 1100. In the event it is determined that the class update is satisfactory, control passes to 1106. In 1106, the class update is statically deployed to a production environment. For example, statically deploying the class update to a production environment comprises adding metadata artifacts to the production environment, removing metadata artifacts from the production environment, or modifying metadata artifacts in the production environment. For example, metadata artifacts comprising classes, attributes, relations, or functions are added to the production environment, metadata artifacts comprising functions are removed from the production environment, or metadata artifacts comprising classes, attributes, relations, or functions are modified within the production environment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for class deployment, comprising:
an ancillary class storage device configured to:
store an ancillary class source for an ancillary class, wherein the ancillary class is outside a base class set; and
a processor configured to:
compile the ancillary class source, wherein compiling the ancillary class source generates a metadata description of one or more ancillary classes, wherein compiling the ancillary class source comprises navigating a graph of ancillary class source artifacts, executing a transform for each artifact to create a metadata artifact builder for each ancillary class source artifact, and building the graph of the ancillary class source artifacts using a set of metadata artifact builders, wherein the metadata artifact builder comprises an instance builder, an attribute builder, or a reference builder, wherein the instance builder determines a metadata artifact identifier for associating with a new instance, wherein the instance builder builds the new instance and associates the new instance with the metadata artifact identifier in the event the metadata artifact identifier for associating with the new instance is not already associated with another metadata instance, and wherein the instance builder does not build the new instance in the event that the metadata artifact identifier for associating with the new instance is already associated with another metadata instance; and
deploy the metadata description into an operating environment, wherein deploying the metadata description adds the metadata description to metadata of the base class set of the operating environment.

2. The system of claim 1, wherein the ancillary class source comprises a plurality of ancillary class source artifacts, wherein each artifact comprises a unique source artifact identifier.

3. The system of claim 2, wherein the ancillary class source artifacts comprise relations, attributes, classes, code, tests, applications, business objects, fields, REST resources, or REST representations.

4. The system of claim 1, wherein the metadata description comprises a plurality of metadata artifacts, wherein each artifact comprises a unique metadata artifact identifier.

5. The system of claim 4, wherein the metadata artifacts comprise classes, attributes, relations to other classes, relations to resources, query index information, business objects, business object fields, data sources, application programming interfaces, or security domains.

6. The system of claim 1, wherein deploying the metadata description into the operating environment comprises dynamically deploying the metadata description to an isolated testing operating environment.

7. The system of claim 1, wherein deploying the metadata description into the operating environment comprises statically deploying the metadata description to a production operating environment.

8. The system of claim 1, wherein the ancillary class source for the ancillary class was developed using an ancillary class development user interface.

9. The system of claim 1, wherein an updated version of the ancillary class source is developed using an ancillary class development user interface.

10. The system of claim 9, wherein deploying the updated version of the ancillary class source adds additional metadata artifacts to the operating environment, wherein additionally added metadata artifacts comprise classes, attributes, relations, or functions.

11. The system of claim 9, wherein deploying the updated version of the ancillary class source removes metadata artifacts to the operating environment, wherein removed metadata artifacts comprise functions.

12. The system of claim 9, wherein deploying the updated version of the ancillary class source modifies metadata artifacts of the operating environment, wherein modified metadata artifacts comprise classes, attributes, relations, or functions.

13. The system of claim 1, wherein a new reference to the new instance is created in response to the reference builder being indicated to create the new reference to the new instance with the metadata artifact identifier.

14. The system of claim 13, wherein the new reference comprises a reference to the instance builder in response to the new instance being targeted by the reference not yet having been built.

15. The system of claim 14, wherein the reference to the instance builder is deleted in response to the instance builder not building the new instance.

16. The system of claim 1, wherein the metadata description of one or more ancillary classes is stored as an archive file.

17. A method for class deployment, comprising:
   storing an ancillary class source for an ancillary class, wherein the ancillary class is outside a base class set;
   compiling, using a processor, the ancillary class source, wherein compiling the ancillary class source generates a metadata description of one or more ancillary classes, wherein compiling the ancillary class source comprises navigating a graph of ancillary class source artifacts, executing a transform for each artifact to create a metadata artifact builder for each ancillary class source artifact, and building the graph of the ancillary class source artifacts using a set of metadata artifact builders, wherein the metadata artifact builder comprises an instance builder, an attribute builder, or a reference builder, wherein the instance builder determines a metadata artifact identifier for associating with a new instance, wherein the instance builder builds the new instance and associates the new instance with the metadata artifact identifier in the event the metadata artifact identifier for associating with the new instance is not already associated with another metadata instance, and wherein the instance builder does not build the new instance in the event that the metadata artifact identifier for associating with the new instance is already associated with another metadata instance; and
   deploying the metadata description into an operating environment, wherein deploying the metadata description adds the metadata description to metadata of the base class set of the operating environment.

18. A computer program product for class deployment, the computer program product being embodied in a non-transitory computer readable storage medium and comprising computer instructions for:
   storing an ancillary class source for an ancillary class, wherein the ancillary class is outside a base class set;
   compiling the ancillary class source, wherein compiling the ancillary class source generates a metadata description of one or more ancillary classes, wherein compiling the ancillary class source comprises navigating a graph of ancillary class source artifacts, executing a transform for each artifact to create a metadata artifact builder for each ancillary class source artifact, and building the graph of the ancillary class source artifacts using a set of metadata artifact builders, wherein the metadata artifact builder comprises an instance builder, an attribute builder, or a reference builder, wherein the instance builder determines a metadata artifact identifier for associating with a new instance, wherein the instance builder builds the new instance and associates the new instance with the metadata artifact identifier in the event the metadata artifact identifier for associating with the new instance is not already associated with another metadata instance, and wherein the instance builder does not build the new instance in the event that the metadata artifact identifier for associating with the new instance is already associated with another metadata instance; and
   deploying the metadata description into an operating environment, wherein deploying the metadata description adds the metadata description to metadata of the base class set of the operating environment.

* * * * *